Figure 1:
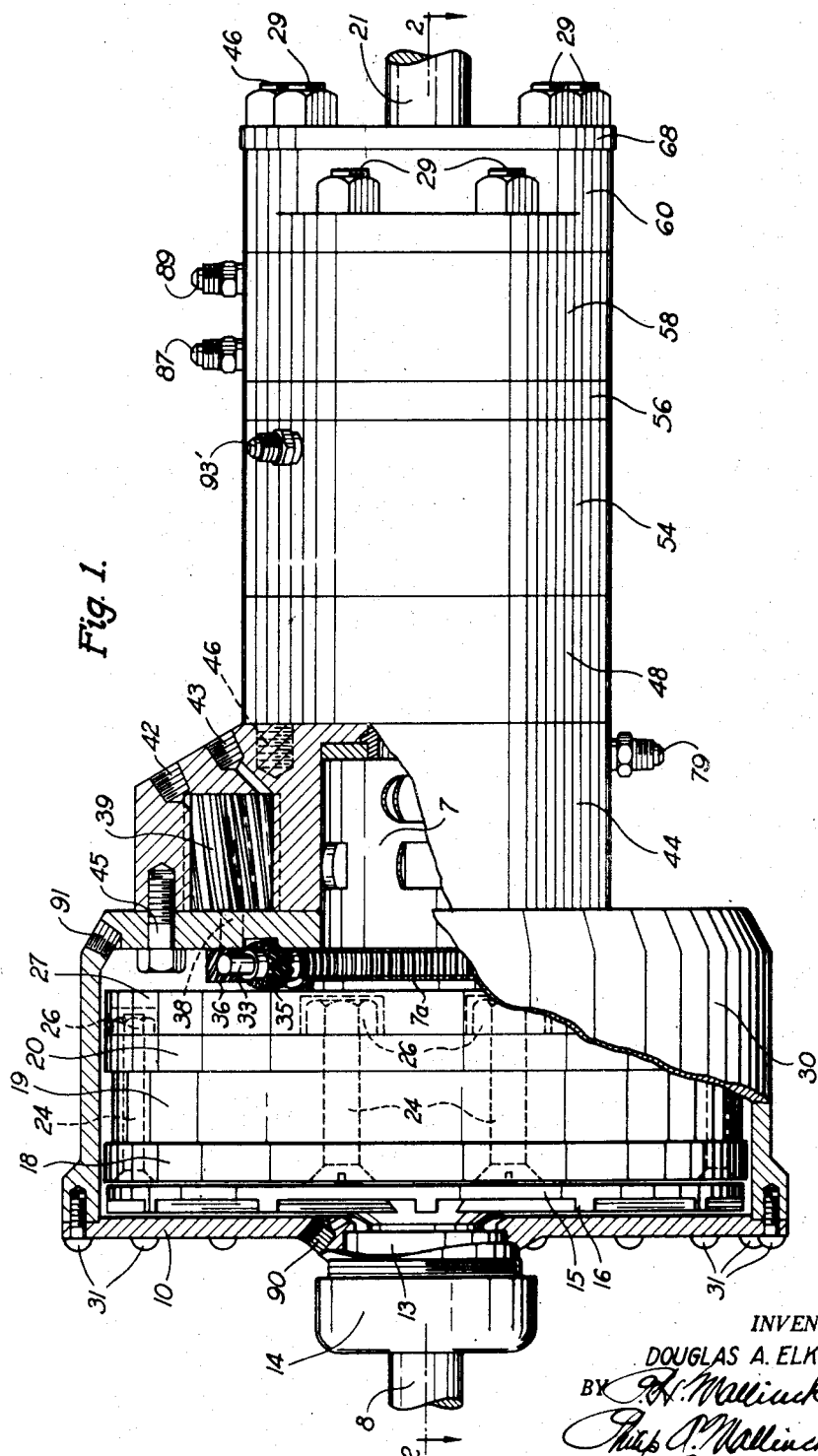

July 21, 1953

D. A. ELKINS 2,645,903

VARIABLE RATIO, ROTARY PUMP AND
MOTOR HYDRAULIC TRANSMISSION

Filed Feb. 20, 1947

8 Sheets-Sheet 3

INVENTOR:
DOUGLAS A. ELKINS,
BY
attorneys.

INVENTOR:
DOUGLAS A. ELKINS,

July 21, 1953     D. A. ELKINS     2,645,903
VARIABLE RATIO, ROTARY PUMP AND
MOTOR HYDRAULIC TRANSMISSION
Filed Feb. 20, 1947     8 Sheets-Sheet 5
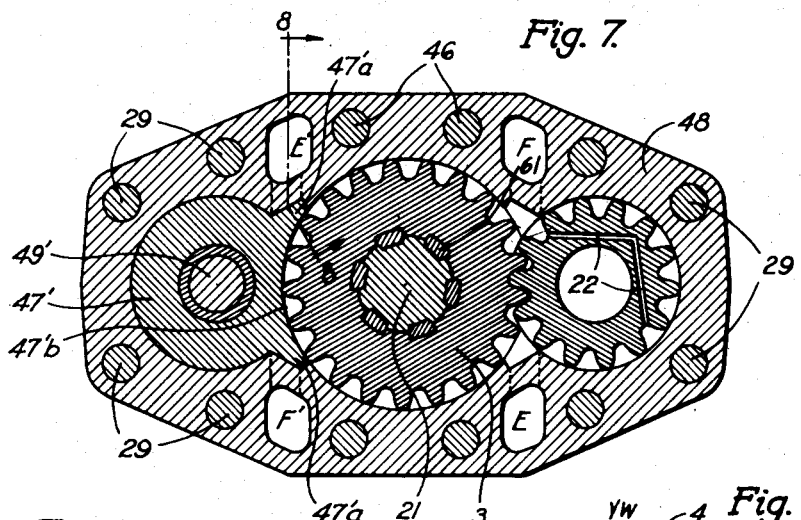
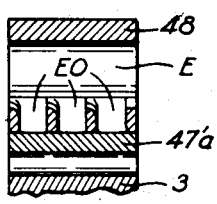
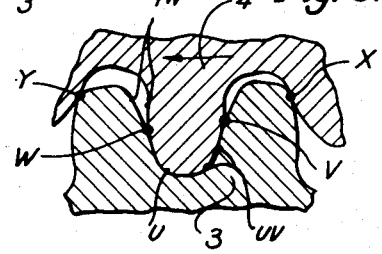
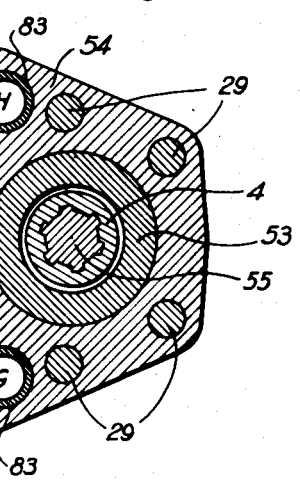
INVENTOR:
DOUGLAS A. ELKINS,
BY

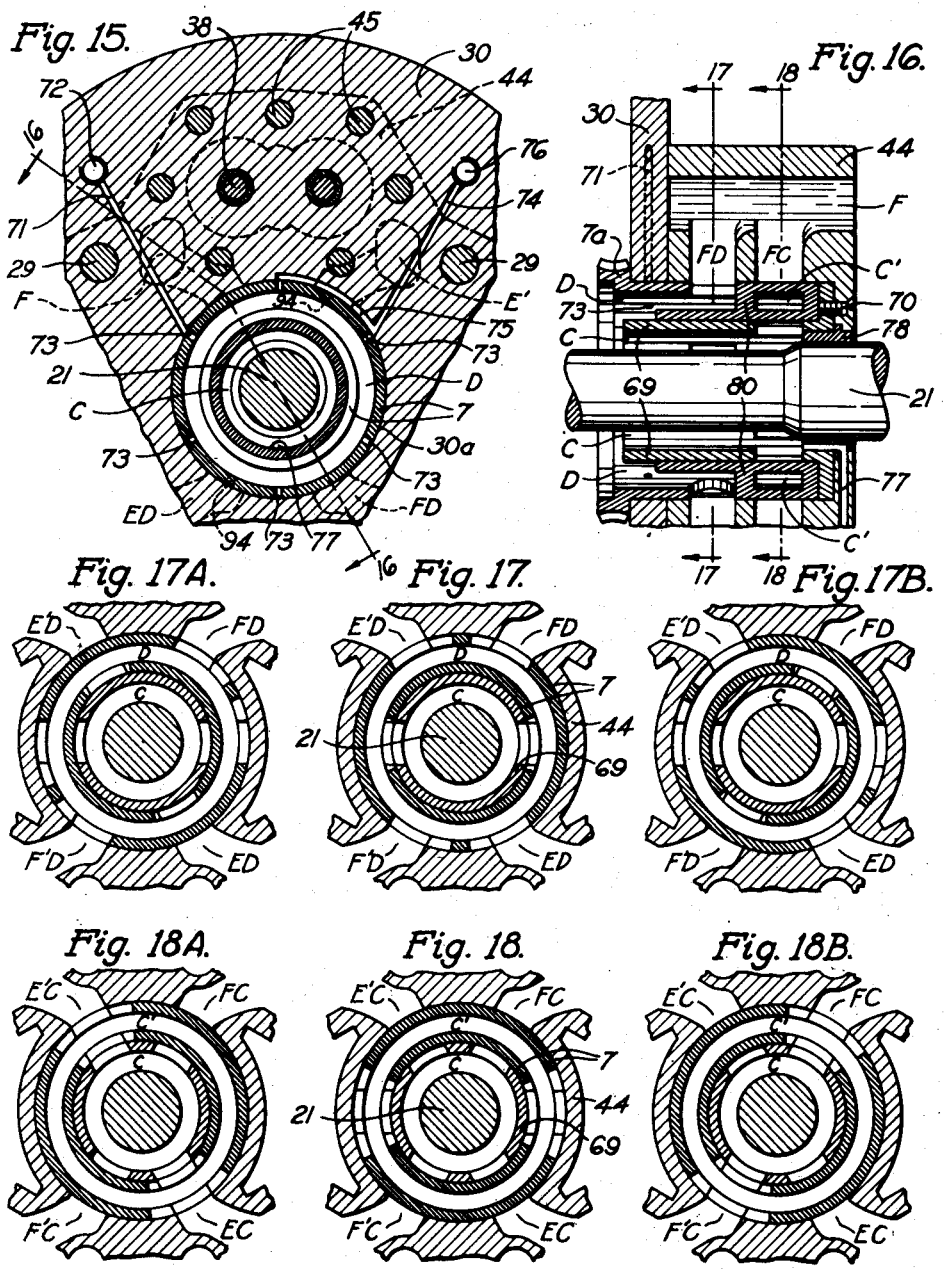

July 21, 1953
D. A. ELKINS
2,645,903
VARIABLE RATIO, ROTARY PUMP AND
MOTOR HYDRAULIC TRANSMISSION
Filed Feb. 20, 1947
8 Sheets-Sheet 8
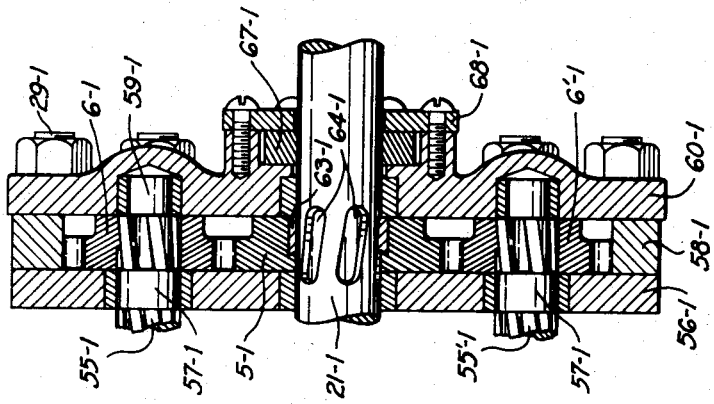
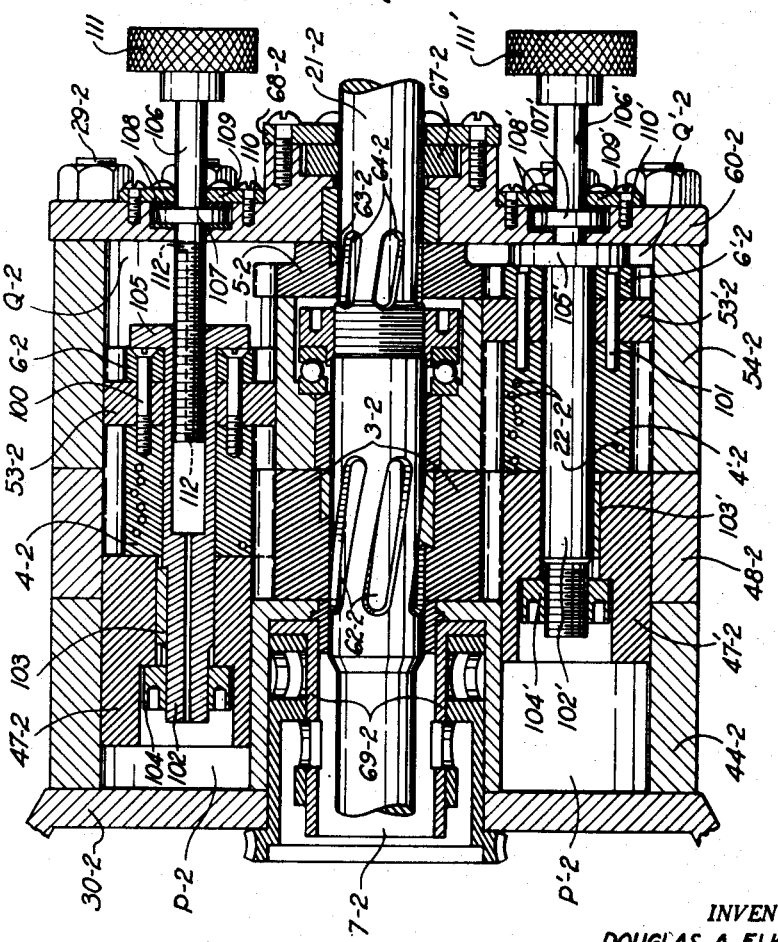
INVENTOR:
DOUGLAS A. ELKINS,
BY
ATTORNEYS

Patented July 21, 1953

2,645,903

UNITED STATES PATENT OFFICE 2,645,903

VARIABLE RATIO ROTARY PUMP AND MOTOR HYDRAULIC TRANSMISSION

Douglas A. Elkins, Salt Lake City, Utah

Application February 20, 1947, Serial No. 729,731

20 Claims. (Cl. 60—53)

This invention relates to power transmissions, and particularly to infinitely variable power transmissions of hydraulic type.

Power transmissions are employed as agencies for transmitting rotative motion from a primary power source to a power output at selective transmission ratios, that is to say, at selectively different ratios of input torque to output torque, or, to express it differently, at selectively different ratios of input speed to output speed. A major field of use for such devices is in the art of powered propulsion, where an engine or motor is utilized to drive a vehicle or the like at various drive ratios selectively determined in accordance with the needs of the moment. The selection of a particular drive ratio may be made manually by the operator of the vehicle, as in the case of the usual hand-manipulated gear shift of conventional automotive transmissions, or may be made automatically, as is done by various known types of automatically controlled transmissions.

The number of possible drive ratios available in a given mechanism may be rigidly fixed by the construction of the transmission, as is true of the conventional three forward gear ratios or speeds—low, intermediate, and high—of the aforementioned transmisisons customarily employed in automotive vehicles, or may be theoretically infinite.

So far as I am aware, there has been up to the present no development of an infinitely variable transmission satisfactorily applicable in the automotive industry.

Internal combustion engines used by the automotive industry as a primary power source have the following performance characteristics:

1. The maximum torque which can be developed varies with rotative speed of the engine, being low at low speeds, increasing to a maximum at an intermediate speed, and dropping off again at top speeds.

2. For any given engine speed, the fuel consumption per horsepower hour is lowest at maximum load or torque, and mounts rapidly as the per cent of maximum load is decreased.

3. Lowest specific fuel consumption is obtained at an intermediate engine speed.

When an automobile is driven at a fixed gear ratio under varying driving conditions, the following disadvantageous condition necessarily exists: At normal driving speeds there must be some excess engine torque available to prevent sluggishness of operation. That is, there must be some reserve torque available at such engine speeds in order to be able to accelerate the car quickly from those speeds to higher speeds, or to care for variations in resistance caused by shifting winds and irregularities in road grade. The excess torque made available in modern, high powered automobiles under average conditions of operation is quite considerable. This means that in average operation the engine is operating low on its torque curve, which in turn means operation at low economy.

The infinitely variable power transmission of this invention makes it possible for the engine to operate high on its torque curve in order to obtain maximum economy, without sacrificing the flexibility ordinarily obtained by having considerable excess torque available.

The present disclosure does not deal specifically with operational controls required for installation along with the transmission of the invention in an automobile, but does cover the transmission itself in a form admirably suited to automotive installations; and, while the transmission of the invention is especially applicable to automotive use, it may be employed generally in a wide variety of forms, either manually variable or automatically variable, designed for the particular need.

The transmission of the invention is of hydraulic type, and in all forms thereof includes two mutually independent power shafts coupled together by a set of gears operable within and interconnected to a fluid-tight casing, such casing being fixed to and rotatable with one of said power shafts. The casing contains a non-compressible fluid, preferably a light-grade lubricating oil, and usually includes valve-controlled ports providing for controlled circulation of fluid through other parts of the transmission.

The control valve governing these ports in the casing performs the function of the clutch as well as some of the functions of the gear shift device, ordinarily employed with conventional transmissions. Operation thereof regulates the passage of fluid through the circulatory system of the mechanism, and causes gradual transition between neutral and speed reduction, overdrive, or reverse.

The set of gears within the casing is arranged to function as a fluid pump when permitted. Thus, when the power output shaft is under load and the circulatory system proper of the transmission is short-circuited by reason of the control valve being in its neutral position—fluid thereby being allowed to circulate only locally between the said ports by way of the control valve—the motion of the power input shaft is entirely spent in ineffective pumping of the fluid through the localized flow circuit. When, however, the control valve is positioned to close such direct intercommunication of the said ports, and conditions in other parts of the transmission are such as to prevent any circulation through the system, the gear set within the casing is not permitted to rotate freely as a field pump, and such gear set, the fluid body surrounding it, and the enclosing casing act as a rigid unyielding coupling between the two power shafts, transmitting rotative motion from one to the other in a direct drive relationship. Between these two extremes is a partial direct and partial fluid drive relationship, wherein the gear set has limited freedom of rotation within its casing as a fluid pump. Such relationship is expressed in terms of reduced speed between power input and power output.

Under such condition of operation, it is a feature of the invention that the energy represented by the difference between input speed and output speed is transmitted to the power output shaft in terms of increased torque. For this purpose there is provided in the transmission, in association with the power output shaft, a second gear set of variable capacity which is adapted to act as a gear motor relative to the power output shaft. Fluid pumped by the first gear set is conducted to the second or variable gear set by the fluid circulating system, where it acts to drive the latter and, thus, the power output shaft. Control means is provided to afford infinite variation of the capacity of the second gear set, within its design limits, in accordance with the drive ratio appropriate under any given operating condition.

Since the second gear set is variable in capacity, and may be adjusted so that component gears thereof are entirely out of mesh, it is desirable to provide timing means for maintaining the mechanism in perfect adjustment. This advantageously takes the form of a third gear set associated with the power output shaft.

In accordance with one aspect of the invention, this third or timing gear set is also utilized as a gear motor, auxiliary or secondary to the second gear set, for impressing the said energy differential upon the power output shaft in terms of increased torque. The capacity, then, of this third gear set, acting as an auxiliary gear motor, added to the variable capacity of the second gear set, acting as a primary gear motor, increases the practical range of drive or speed variation afforded by the transmission. To this end, control means is provided for bringing such third or timing gear set into the system as an auxiliary gear motor.

In addition to the relationship resulting in infinitely variable reduced speed ratios between power input and power output, the structural arrangements outlined above, provide for operative relationships resulting in infinitely variable overdrive ratios and infinitely variable reverse-drive ratios.

For overdrive ratios, the control valve is positioned in such manner as to connect the high pressure side of the first gear set with the high pressure side of the second gear set. Under such conditions, if the fluid capacity of the second gear set is less than that of the first, the second gear set acts as a fluid pump rather than a fluid motor. The fluid then pumped by the second gear set causes the first gear set to act as a motor, superimposing additional rotative motion upon the already rotating output shaft, that is to say, the power output component of the coupling between the two power shafts is stepped up to rotative speeds higher than respective rotative speeds of the power input component. Variation of overdrive ratios is accomplished by the same control means previously mentioned in connection with variation of reduced speed ratios.

For reverse-drive ratios, the control valve is positioned in neutral during the time required for the above-referred-to control means to place the second and third gear sets in condition of maximum capacity; whereupon it is moved to overdrive position. Operating as gear motors under these circumstances, the second and third gear sets overcome any tendency toward direct drive from power input shaft to power output shaft and effectively rotate the power output shaft in reverse. Variation of reverse-drive ratio is accomplished through the said control means by decreasing the capacity of the second gear set.

Of the two independent but coupled power shafts provided in the transmission, either may be used as the power input shaft or the power output shaft, with, however, somewhat different results being produced by the two opposite uses. For most uses, that one of the power shafts which is rigidly fixed to and rotatable with the fluid-tight casing will be taken as the power output shaft, with operative results as above described.

Of the several gear sets the first is planetary, embodying one or more planet gears journaled to the interior walls of the fluid-tight casing and in mesh with a sun gear which is fixed to one of the power shafts. The casing is fixed to the other of the power shafts, and when not in direct-drive relationship, the planet gear or gears revolve about the rotating sun gear. Such planetary gears are adapted to act as a motor, in overdrive for instance, for driving the casing and the power output shaft to which it is attached, at a speed greater than that of the power input shaft.

The second or variable gear set embodies a gear fixed to the same power shaft that the said fluid-tight casing is fixed to, and includes one or more gears normally in mesh with the fixed gear but movable relative thereto axially for varying the degree of mesh, preferably from substantially complete disengagement to full meshing engagement. Plunger type actuating mechanism hydraulically controlled is advantageously employed to move the movable gear or gears longitudinally of the axis of the fixed gear into any desired degree of intermesh, thereby achieving any desired drive ratio for the transmission as a whole within its design range.

The third or timing gear set, corresponding in general with the variable gear set which it must keep in adjustment, is of fixed or constant mesh. It may be variously formed and arranged relative to the variable gear set, depending upon the performance desired from particular embodiments of the transmission. Thus it may be arranged to operate as an auxiliary gear motor or pump, as previously mentioned, or it may be given only a timing function.

The control valve of the transmission and the fluid circulatory system involve novel features of fluid flow control and utilization which are especially advantageous in correlation with the respective sets of gears outlined above. Furthermore, the gear tooth arrangement and design provided for the respective gears of the second or variable capacity set is such as to effectively seal against fluid flow axially of said gears between intermeshing teeth thereof at all the various positions of intermesh.

Among the principal objects of the invention are:

To provide an infinitely variable power transmission mechanism adapted for automotive use as well as for general use.

To provide such a transmission capable of either manual or automatic control.

To provide such a transmission which makes possible the consistent operation of an internal combustion engine high on its torque curve for the sake of economy of operation, without the sacrifice of such flexibility of operation as is ordinarily obtained by having considerable excess torque available.

To make possible more satisfactory and easier operation and control of an automobile, with less fuel consumption than heretofore, and therefore, at lower cost.

To provide a sturdy and compact infinitely variable transmission which is relatively inexpensive to construct and which is adapted to be controlled hydraulically.

The above and further objects and features of the invention will be fully considered in the following detailed description of the several preferred constructions illustrated by way of example only, in the accompanying drawings.

Figure 2:
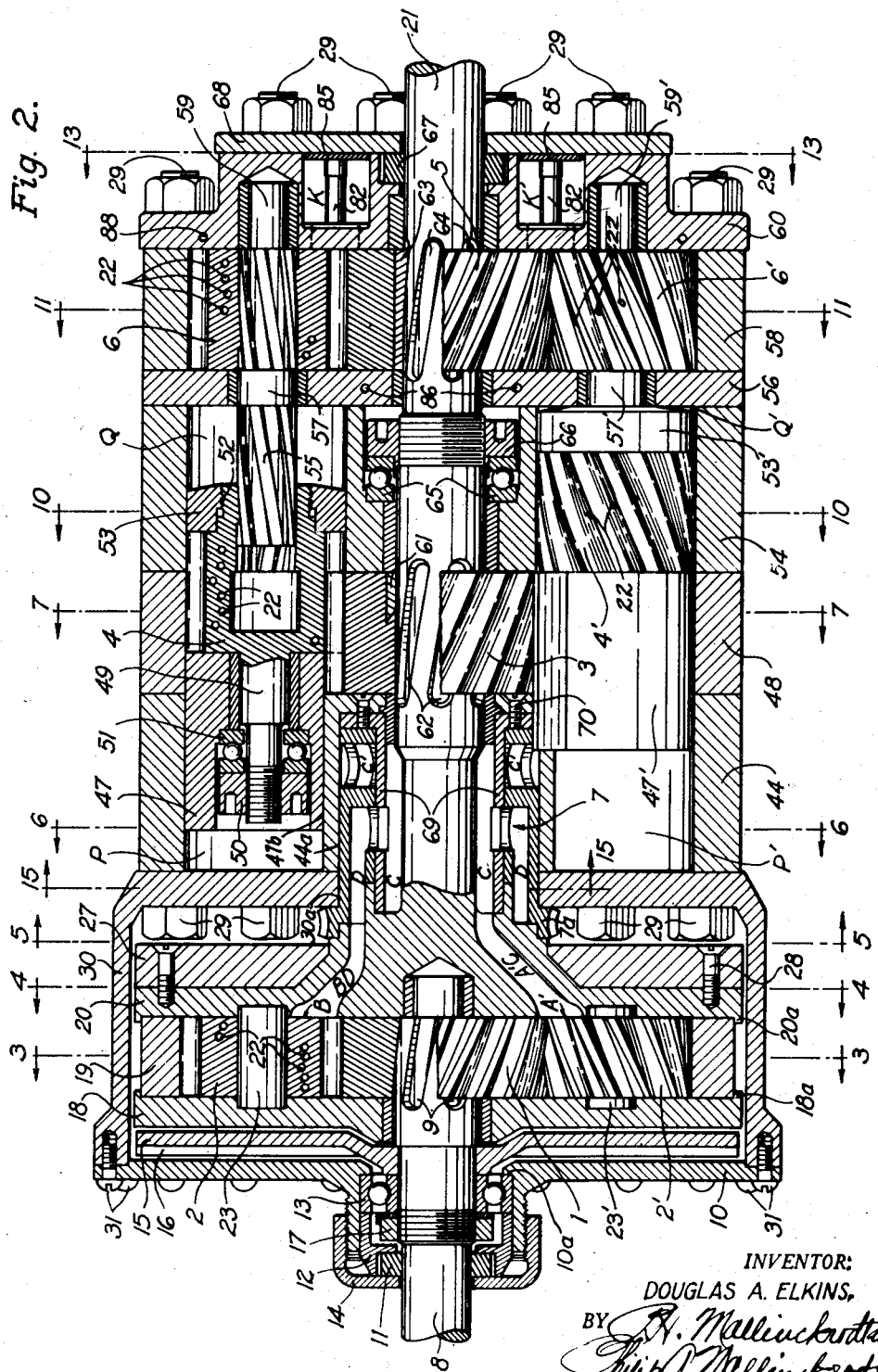
Figure 3:
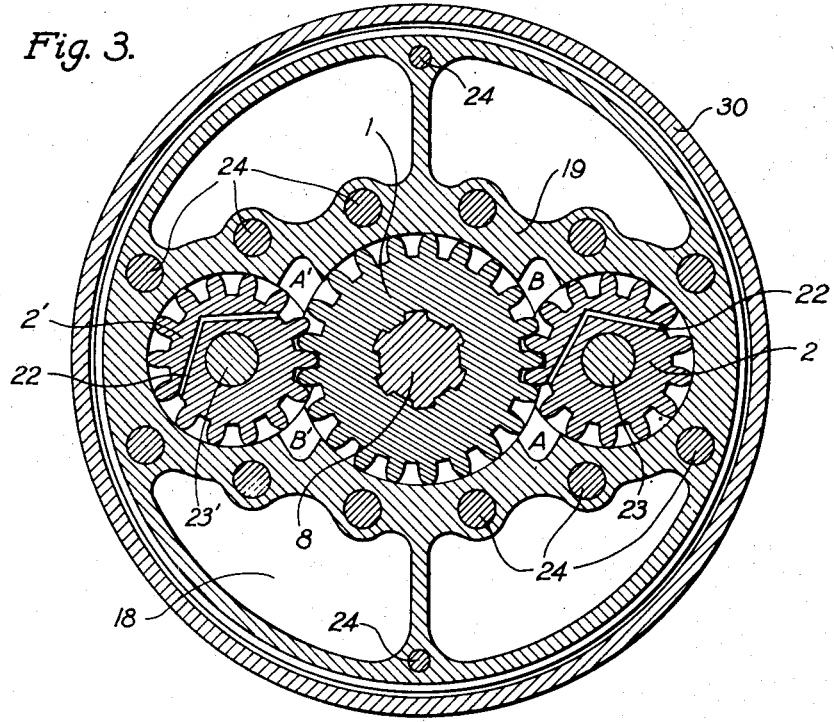
Figure 4:
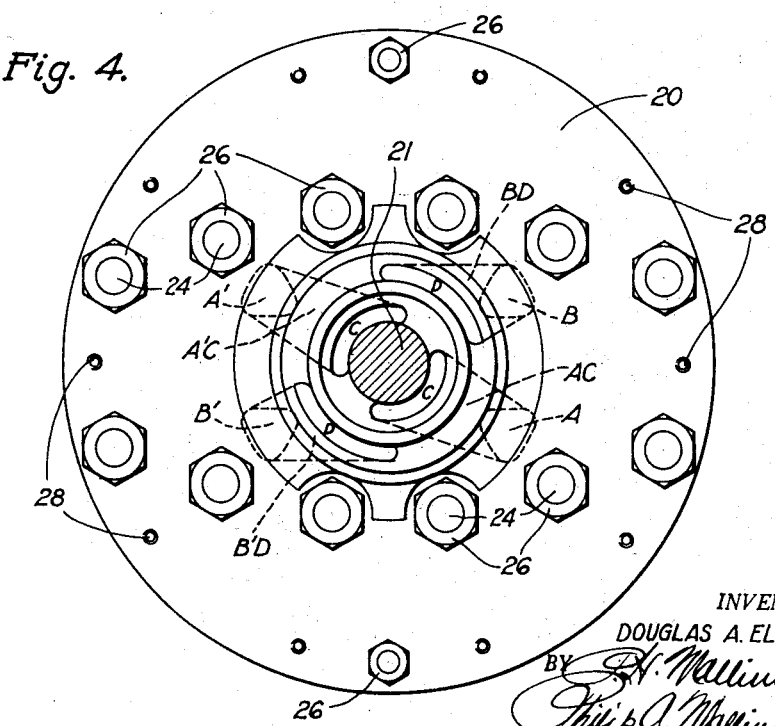
Figure 5:
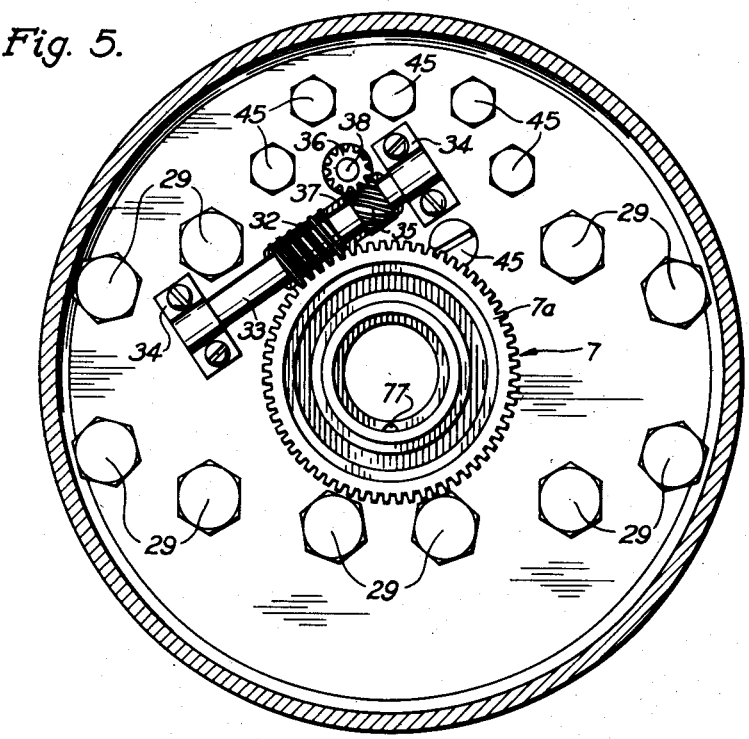
Figure 6:
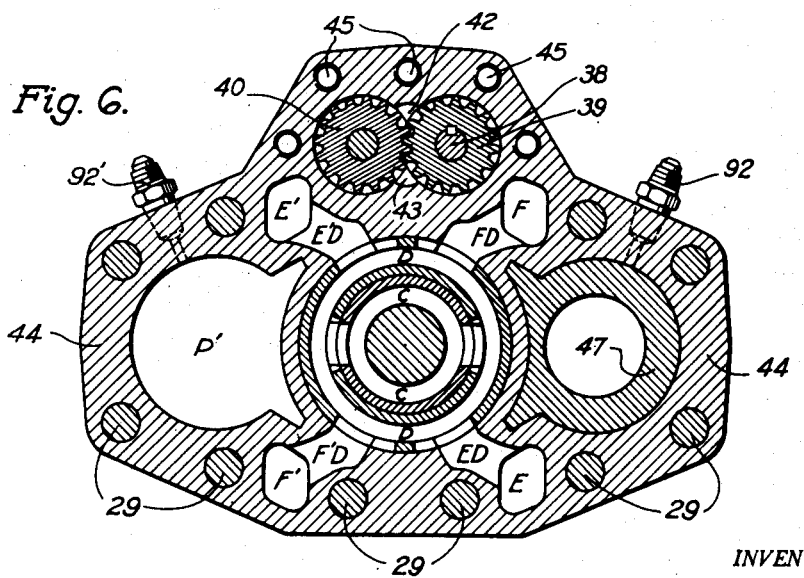
Figure 12:
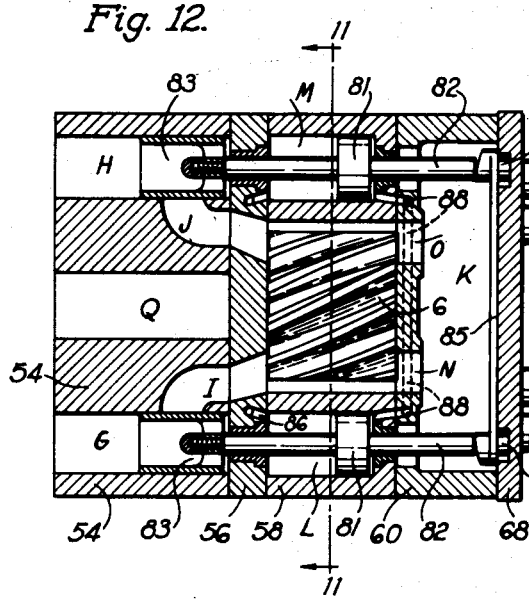
Figure 11:
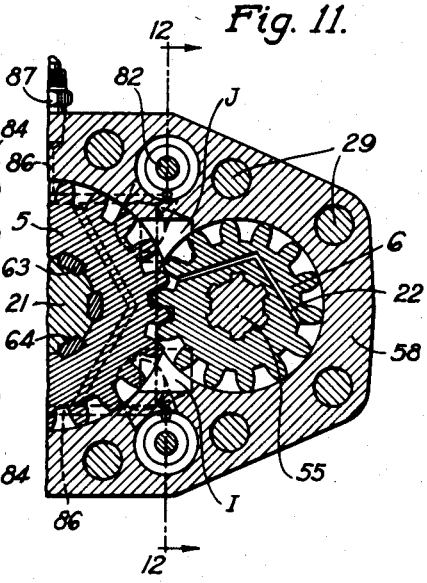
Figure 14:
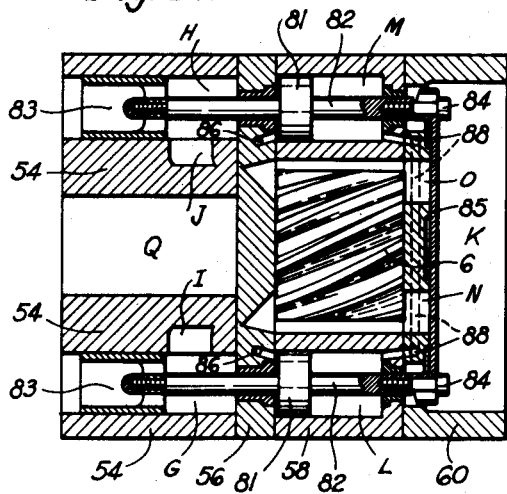
Figure 13:
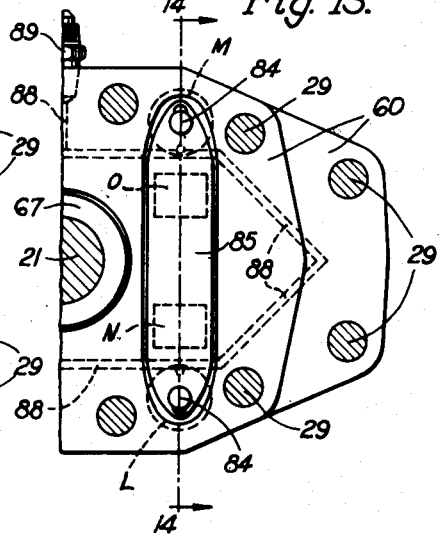

In the drawings:

Fig. 1 represents a side elevation, partially in section, of an entire transmission mechanism constructed in accordance with the invention;

Fig. 2, a horizontal section taken on the line 2—2, Fig. 1, certain port holes having been arbitrarily moved to the section plane;

Fig. 3, a vertical section taken along the line 3—3, Fig. 2;

Fig. 4, an elevation of the transition plate of the gear casing, which is provided with ports for conducting fluid from the first gear set or pump of Fig. 3, the view being taken approximately on the line 4—4, Fig. 2;

Fig. 5, an elevation of the control valve drive mechanism as viewed from the line 5—5, Fig. 2, with the shaft and ported transition piece and all forward mechanism removed;

Fig. 6, a vertical section taken along the line 6—6, Fig. 2;

Fig. 7, a vertical section taken along the line 7—7, Fig. 2;

Fig. 8, a fragmentary longitudinal section taken along the line 8—8, Fig. 7;

Fig. 9, an enlarged fragmentary section of meshing gear teeth of the intermeshed, variable mesh gears of Fig. 7;

Fig. 10, a vertical section taken along the line 10—10, Fig. 2;

Fig. 11, half of the symmetrical vertical section taken along the line 11—11, Fig. 2, see also the line 11—11, Fig. 12;

Fig. 12, a longitudinal vertical section taken along the line 12—12, Fig. 11, with the center gear of the timing set removed;

Fig. 13, half of the symmetrical end elevation of the transmission as viewed from the right in Fig. 2, with the rear cover plate removed to show the by-pass valve, see the line 13—13, Fig. 2;

Fig. 14, a longitudinal vertical section taken along the line 14—14, Fig. 13, the by-pass valves being shown closed;

Fig. 15, a fragmentary vertical section taken along the line 15—15, Fig. 2;

Fig. 16, a fragmentary longitudinal section through the control valve as taken along the line 16—16, Fig. 15;

Fig. 17, a fragmentary vertical section through the control valve as taken along the line 17—17, Fig. 16, the valve being in its neutral position;

Fig. 17A, a view similar to that of Fig. 17 except that the valve is in reverse or overdrive position;

Fig. 17B, a view similar to that of Fig. 17 except that the valve is in forward drive position;

Fig. 18, a fragmentary vertical section through the control valve as taken along the line 18—18, Fig. 16, the valve being shown in its neutral position;

Fig. 18A, a view similar to that of Fig. 18 except that the valve is in reverse or overdrive position;

Fig. 18B, a view similar to that of Fig. 18 except that the valve is in forward drive position.

Fig. 19, a fragmentary horizontal section corresponding to that of Fig. 2 but illustrating only the extreme rear sections of an alternate construction in which the timing gears are not used as an auxiliary fluid pump; and Fig. 20, a fragmentary horizontal section corresponding to that of Fig. 2 but illustrating all but the extreme forward section of an alternate construction arranged for manual control.

Referring now to the particular form of the invention illustrated in Figs. 1 through 18B, the fundamental elements thereof can all be seen in Fig. 2. They are the three sets of gears 1, 2 and 2'; 3, 4 and 4'; and 5, 6 and 6'; and the rotary valve 7.

The sets of gears are all shown in section on one side of the central longitudinal axis of the transmission and in elevation on the other. Those gears shown in elevation are exact duplicates of their respectively opposite gears and are designated by the same numeral with a prime added. The transmission can be constructed with only two gears in each set; three, as illustrated, which gives better balance; or any number which can be effectively added to increase capacity or range of variation.

The gear set positioned to the left in Fig. 2, which may be considered the forward or first set, consists of a center gear 1 and two gears 2 and 2'. Since it is primarily by control of the relative rotation of these gears that speed variation is accomplished, they will be sometimes referred to as the "controlled" planetary gears. The center or sun gear 1 is mounted on a shaft 8 to which it is secured against rotation, by helical splines set in helical keyways 9. These splines and corresponding keyways 9 have the same lead as the helical teeth of gear 1, thereby allowing gear 1 to float freely in its housing while transmitting end thrust, as well as torque, to the shaft 8.

The shaft 8, serving for purposes of this description as the power input shaft, though at certain times capable of serving also as the power output shaft, enters the transmission housing through front cover plate 10. Fluid is prevented from leaking out around the shaft by the provision of a seal ring 11, held by a sleeve 12. The sleeve 12 also holds radial-thrust bearing 13 in place against a shoulder 10a of the plate 10. The entire assembly is held in place by the nut 14.

The hub of an impeller wheel 15 serves as a spacer between the bearing 13 and a shoulder on the shaft 8. This impeller 15 has radial fins 16 on its forward face, and is secured to rotate with the shaft 8. The locked nut 17 holds the inner race of the bearing 13 against the hub of the impeller.

The casing of the set of controlled planetary gears is composed of a front plate 18, an intermediate section 19, and a back plate 20. The shaft 8 is journaled at the center of the plate 18, and also at the center of plate 20, as shown. The casing section 19 closely encompasses the gear set 1, 2 and 2', and as shown in Fig. 3 enables it to act in a pumping capacity in association with diametrically opposite ports A and A' and B and B' formed in the back plate 20. Passages 22 are drilled progressively from one end of the gears 2 and 2' to connect all diametrically opposite tooth spaces of such gears, for the purpose of balancing pressures and of floating the gears in the housing. Similar passages are drilled in gears 4, 4', 6 and 6'.

The back plate 20 of the casing is rigid with and conveniently an integral part of power output shaft 21, and, as illustrated in Fig. 4, serves as a transition piece between the fluid pump, formed by the controlled set of planetary gears 1, 2 and 2', and the valve 7. It carries fluid from the ports A and A', Fig. 3, to an inside annular opening C around the shaft 21, and from the ports B and B' to another annular opening D. Of the channels AC, A'C, BD and B'D through which these connections are made, A'C and BD are here arbitrarily rotated into the picture plane of Fig. 2 to better illustrate the arrangement.

The planet gears 2 and 2' rotate on shafts 23 and 23', respectively, which extend between and are supported by the plates 18 and 20. The gear casing, made up of the separable elements 18, 19 and 20, is fluid-tight, and is held together by bolts 24, Figs. 1 and 3, which also act as dowels to locate and support the casing section 19. Lips 18a and 20a, formed around the periphery of the respective plates 18 and 20, see Fig. 2, serve to additionally support casing section 19.

The nuts 26 on bolts 24 are covered by an appropriately recessed plate 27, Figs. 1 and 2, which is secured to the plate 20 by screws 28. The plate 27 eliminates any churning action between nuts 26 and the heads of bolts 29, which bolts secure an outer housing 30 to the rear or back portion of the transmission. Such outer housing 30 fits into the inner face of the front cover plate 10, and is fastened to it by the screws 31. Together, the housing 30 and cover plate 10 provide a reservoir of fluid in which the impeller 15 builds up various pressures depending upon the speed of rotation of the shaft 3.

In Fig. 5, wherein the inside rear wall of the housing 30 is illustrated, portions of the drive for the rotary control valve 7 are shown. In this particular transmission, such drive is hydraulic. The flanged periphery 7a of the valve 7, where it enters the housing 30, is toothed to mesh with the worm 32 of the drive. The shaft 33 on which the worm 32 is mounted is journaled in the bearings 34 which are attached to the housing 30, as shown. Also mounted on the shaft 33 is a spiral gear 35 which meshes with another spiral gear 36. A recess 37, milled into the wall of the housing 30, gives clearance for the worm 32 and gear 35.

The spiral gear 36 is pinned to a shaft 38 which extends through the rear wall of the housing 30, see Fig. 6. Here it is keyed to a gear 39 in mesh with a gear 40, forming a gear motor which is driven by fluid supplied through ports 42 and 43, shown as tapped holes in Fig. 1. These gears have pressure balancing passages (not shown) similar to the passages 22 which float the gears in their housing. Around the end of the small gear motor 39, 40, the housing 30 is secured to a section 44 of the rear housing by screws 45. In place of two of the bolts 29, which would otherwise fill the space occupied by the gear motor, long stud bolts 46 are used.

As shown in Figs. 6 and 17 passageways ED, E'D, FD, and F'D are adapted to connect the chamber D of rotary valve 7 at the illustrated position of such valve, with those respective longitudinal channels E and E' and F and F' which extend through housing sections 44 aand 48.

As shown in Fig. 18, similar passageways EC, E'C, FC and F'C are adapted to connect the chamber C (through C') of the rotary valve 7 with respective longitudinal channels E and E' and F and F' at other positions of the valve 7 as illustrated in Figs. 18A and 18B.

In the housing section 44 and the adjoining housing section 48, at opposite sides of rotary valve 7, are provided mutually similar cylinders P and P', see Fig. 2, within which operate the respective pistons 47 and 47'. These pistons move to the rear out of housing section 44 and into housing section 48, where they cover the respectively adjacent face portions of gear 3 of the variable or second gear set, as piston 47' is shown to be doing in Figs. 2 and 7.

A shaft 49, shown integral with the gear 4, Fig. 2, of the second gear set, passes through and is journaled in the rear end of the piston 47. The piston 47 is held against the forward end of gear 4 by the locked nut 50, which is screwed onto the end of the shaft 49 and transmits end thrust from the gear 4 to the thrust bearing 51. To the opposite end of the gear 4, the threads 52 secure a collar 53 which makes a rotating fit in section 54 of the housing and seals the ends of the gear teeth.

The collar 53 and the rear of the gear 4 make a sliding fit on a helical splined shaft 55. Where the shaft 55 passes through the divider plate 56 in the housing, the splines are turned off and a split collar 57 is secured thereat to provide a smooth bearing surface. Beyond the plate 56, the shaft 55 extends into section 58 of the housing, where it is secured to the gear 6 of the third or timing gear set. A reduced section 59 of the shaft 55 is journaled in the rear section 60 of the gear housing.

Through the shaft 55, the gear 6 acts as a timer for the gear 4. For this purpose, the helical splines on the shaft 55 have the same lead as the tooth helix of the gears 4 and 6.

The piston 47' and gears 4' and 6' involve similar construction at the opposite side of the transmission.

The shaft 21 is journaled in the rear of housing section 44, in the front of housing section 54, in the spacer 56, and in the rear housing section 60, as shown in Fig. 2. The gear 3 of the second gear set is splined to the shaft 21 on the helical keys 61 positioned in helical keyways 62, as shown in Figs. 2 and 7. The helix formed by the keys 61 has the same lead as the tooth helix of the gears 3 and 5 of the first and third gear sets, respectively. As shown in Figs. 2 and 11, the gear 5 is splined to the shaft 21 by the helical keys 63 positioned in keyways 64 which are continuations on a smaller radius of the helical keyways 62.

The thrust bearing 65, Fig. 2, positioned on the shaft 21 by the locked nut 66, transmits end thrust from that shaft to housing section 54.

Where the shaft 21 leaves the rear of the housing it passes through a seal ring 67 which is held in place by the rear cover plate 68.

The bolts 29 and 46 which hold the transmission together, also serve as dowels to position various parts of the housing relative to others, and to enable the rigid sections to reinforce and support the more flexible ones.

It is to be understood, of course, that the housing of the transmission, made up as it is of the several parts 10, 30, 44, 48, 54, 56, 58, 60, and 68, in the manner hereinbefore described, does not rotate. It forms a stationary component of any installation of which the transmission is a part.

The gears 4 and 4', arranged as they are in combination with the pistons 47 and 47' and sealing collars 53 and 53', form a variable capacity pumping unit with the gear 3. The pumping capacity of either gear 4 or 4' depends upon how much of its gear face is in mesh with the gear 3.

To prevent what otherwise would be leakage of fluid by flow longitudinally between intermeshing teeth which would weave or lace at the ends of such teeth between the two longitudinal channels formed by the teeth, helical gears are provided. Such gears advantageously have gear teeth so formed that in the combination of various cross sections taken in axial progression along the zone of gear intermesh, (which in this case differ from one another due to the change in phase of intermesh caused by advance along the tooth helices), a closed envelope is provided by the lines of contact between the teeth. As hereinafter set forth in more detail, helical teeth formed with negligible running clearance and with negligible backlash provide such closed envelope.

This arrangement cannot provide a complete seal under all conditions. For instance, when the gears are out of mesh, as gears 3 and 4' are shown to be in Fig. 2, there is no tendency for them to pump. There is however a maximum tendency for fluid leakage by weaving or lacing between the adjacent tooth ends. In this case the open areas between what would be contact points if the teeth were in mesh represent simple orifices through which leakage could take place. In the present embodiment of the invention leakage is prevented by wing extensions on the respective pistons, see the wing extensions 47'a of piston 47', Fig. 7. When the gear 4, or 4', is out of mesh, the wings of piston 47 or piston 47' completely seal the ports E and F, or E' and F', by covering the lateral outlets therefrom, see especially the outlets EO, Fig. 8.

As part of their sealing function, the wing extensions on the pistons 47 and 47' extend the surfaces of arcuate recesses 47b and 47'b in these pistons. These surfaces make sliding contact with the tooth tips of that portion of the gear 3 not meshing with the respective gears 4 or 4', and are extended beyond the lines of intersection of the addendum circles of the gears 3, 4, and 4', so that there will not be diagonal openings for leakage across said surfaces through the tooth spaces of the non-meshing portion of the gear 3, even though the teeth of these gears may be cut on relatively steep helices.

When either of the gears 4 and 4' is completely in mesh with the gear 3, the operating conditions are practically the same as in an ordinary set of pumping gears, and they operate with comparable efficiency. As has been pointed out, however, the conditions which arise when these gears are only partially in mesh necessitates the provision of helical gears whose gear teeth have negligible backlash and negligible running clearance and are otherwise formed to seal against axial leakage through the spaces between meshing teeth.

When the teeth of ordinary power transmission gearing pass through their meshing cycle, tooth contact is first made when a point near the base on the forward flank of the driving tooth touches a point near the tooth tip on the rear face of the driven tooth. Assuming gear 4 in Fig. 9 to be the driving gear and to be rotating in a clockwise direction as indicated, this contact would occur at the point X. As the teeth pass through their meshing cycle, this contact point progresses down the rear face toward the base of the driven tooth and up the forward flank toward the tip of this driving tooth. This is the only point of contact necessary for the action of the gear teeth.

The tooth outline utilized in accordance with this invention is such that there are other points of tooth contact, or at least points of close enough proximity to serve as hydraulic seals. One of these seal points originates at the point of first contact, but during the meshing cycle it moves on the tooth surfaces in a direction opposite the direction of the motion of the pressure point. This seal point moves, without appreciable interruption, around the root of the driving tooth to the flank of the tooth ahead, and, on the surface of the driven tooth, it moves across the tip to its opposite, or forward, face during the meshing cycle.

These teeth are cut not only with negligible running clearance to make it possible to carry the seal across the tooth tips, but also with negligible backlash. With no backlash, another point of contact, or close proximity, originates when a point near the tooth tip on the rear face of the driving tooth contacts a point near the base on the forward flank of the driven tooth. This seal point also divides as the teeth progress through their meshing cycle. One of the seal points originating from this division moves down the rear face of the driving tooth to a point near the base of that tooth, where it meets the seal point originating at the point of first contact on the driving tooth behind it. This meeting takes place at the point where contact between the teeth is broken, see point Y, Fig. 9. The other seal point originating from this division moves forward around the tip of the driving tooth and across the root of the driven tooth to meet the pressure point on the tip of the front face of the driving tooth at the second point where contact is broken.

In the cross-section shown in Fig. 9, there are five seal points in transition along the surfaces of the gear teeth. These points are located approximately at the points U, V, W, X, and Y. The original contact point X is in the process of dividing into two points, one of which will move around to join the point V. The points V and U both originated at the points marked UV. The point U is moving to join the point W. Two seal points have just joined at the point Y, where contact will be broken. One of these points located at Y originated with W at the points marked YW.

The result of using helical teeth of this special outline can be visualized from Fig. 9. Since at progressive sections along the axis of the gears the teeth will be in progressive phases of intermesh due to their advance along the helix angle, the contact or seal points will form a seal line which will progress around the tooth surfaces and effectively seal off one of the two openings, between Y and W or between V and X depending upon the direction of the tooth helix, against axial flow of fluid.

It will be evident that there must be enough gear face in mesh to present a certain minimum advance along the tooth helix. It will also be evident that there must be a sufficient number of teeth on the meshing gears to insure enough teeth in mesh, at any given time that a seal will be established behind an exposed tooth end before, or very shortly after, the seal ahead of it is broken.

It should be noted that the sealing envelope formed by the seal points is of a transitory nature and shifts along the gear teeth as they pass through their meshing cycle. Thus, it acts as more than just a static seal. In shifting along the teeth it carries fluid with it, thus causing a controlled flow of fluid along the spaces between the meshing teeth. It is desirable from the standpoint of volumetric efficiency that as much of this flow as possible be directed toward the port from which the gear teeth enter into mesh. It will also be evident that the channels through which this controlled flow takes place must present sufficient opening to prevent trapping or cavitation.

It is characteristic of these gears that a small amount of fluid will be transferred past the exposed tooth ends in a direction counter to the normal transfer of fluid by way of the gear tooth spaces. This fluid is that which otherwise would have been trapped against the end wall. Its amount depends upon the characteristics of the gear teeth. Actually for some tooth forms it is an almost insignificant quantity.

This flow will reduce the displacement volume slightly, but it does not theoretically represent a loss of energy since flow does not take place by leakage but rather by positive pumping or motor action.

Several tooth outlines may be satisfactory for this sealing purpose. The teeth need not be self driving, since the variable mesh gears 4 and 4' are always driven by the timing gears 6 and 6'. The particular tooth form shown in Fig. 9 is a modified involute consisting of involute curves on the working faces, curves making an appropriate gradual transition between the involute curves and the addendum circle at the tooth tip, and other curves extending between the bases of adjacent teeth, such latter curves being formed to fit the envelope of the meshing tooth tip passing through its meshing cycle. The said envelope, it should be noted, is the imaginary outline generated in the rotating plane of the gear under consideration by a tooth tip of the respective meshing gear passing through its meshing cycle. As aforestated, in this design contact is made approximately at the point X, such contact point then dividing and running along the surface of each tooth to unite and break approximately at the point Y. The word "contact" is used here to means sufficiently close proximity to cause an effective hydraulic seal, and not necessarily metal to metal contact.

Since these variable mesh gears are not always operating far enough in mesh that there is the necessary one-half tooth interval of advance along the meshing helix, the fact that this tooth outline also provides areas of close contact as well as a continuous line contact is a decided advantage. Such an area is illustrated between the points V and W in Fig. 9. A similar tooth outline can be used in which the working faces are formed to cycloidal curves.

The rotary control valve 7 is shown in detail in Fig. 2 and Figs. 15 to 18. The movable valve member is contained in an annular space formed between the cylindrical inner wall 44a of housing section 44 and a cylindrical sleeve 69 which is secured in section 44 of the housing by screws 70. There is a circular opening 30a in the back wall of housing section 30, which forms a continuation of the said annular space and accommodates the forward portion of the valve. A forward wall end of the valve 7 is stepped backwardly relative to the forward end of the sleeve 69 so that both make sliding contact with rear surfaces of the transition piece or back plate 20. These contacting surfaces provide rotating seals between annular chambers C and D, chamber C being formed between shaft 21 and sleeve 69, and chamber D between spaced walls of the movable valve member itself.

On a plane passing through the center of the back wall of the forward housing section 30 parallel with the wall faces thereof, see Fig. 15, there is a passage 71 which terminates at one of its ends in a tapped hole 72, and opens against the outer surface of the valve 7 at its other end. In the same plane there are six holes 73 through the outer wall of the valve 7, and so located that they will provide communication between the annular chamber D and the tapped hole 72 only when the valve 7 is in the position shown, or has been rotated in either direction by some multiple of 60°. Through the tapped hole 72 a connection may be made to a fluid pressure source whereby, through valve mechanism not shown, control of the supply of fluid to gear motor 39—40 may be effected, it being noted that such gear motor 39—40 rotates valve 7. The valve arrangement may be such that, when one of the holes 73 is in registry with passage 71, the supply of fluid to gear motor 39—40 is cut off, thereby halting rotation of valve 7.

In the same plane, another passage 74 terminates at its inner end in an arcuate slot 75, which extends slightly more than 60° around the surface of the valve 7. Through this slot 75 and the holes 73, the passage 74 maintains continual communication between the chamber D and the tapped hole 76.

Another passage 77, shown in Figs. 15 and 16, runs from the annular chamber C along the outside of the bushing 78 and out through the rear wall of the housing section 44 to the outlet 79, Fig. 1.

A wall 80, Fig. 16, in the annular chamber D of valve 7 divides off a rear chamber C' which serves as an auxiliary to the inner chamber C. On either side of the division 80 there are ports cut in the sleeve 69, the valve 7 and the housing section 44. The relative positions of these ports when the valve 7 is in neutral position, is shown in Figs. 17 and 18. Figs. 17A and 18A show the relative positions when the valve 7 has been rotated 60° clockwise (considered from the standpoints of Figs. 5 and 15) from the neutral position. Figs. 17B and 18B show the relative positions when the valve 7 has been rotated 60° counterclockwise from the neutral position.

In this form of the transmission, the gears 5, 6, and 6' serve not only as timing gears to keep the gears 4, and 4' rotating in proper synchronism with gear 3 when they are out of mesh or to drive the gears 4 or 4' when they are not sufficiently in mesh with gear 3 to be self driving, but they also are adapted to act as an auxiliary set of pumping gears. The control of pumping by these gears necessitates the use of an additional set of valves, illustrated in Figs. 11, 12, 13 and 14.

The longitudinal cylindrical channels G, G', H and H', Fig. 10, are continuations in housing section 54 of the respective channels E, E', F and F', Fig. 7, in housing sections 44 and 48. Through the respective intermediate passages I, I', J and J', Figs. 11 and 12, the passages G, G', H and H' communicate with the ports N, N', O and O' respectively, of the timing gears 5, 6 and 6'. (Since only the right half of housing sections 58 and 60 are illustrated in Figs. 11 and 12, the ports N' and O' and the passages I' and J' do not appear. The portions not shown are, however, duplicates of the illustrated portions of similar designation.)

Through the forward wall of the rearmost housing section 60, the ports N, O and N', O' communicate with the chambers K and K', respectively, see Figs. 12 and 14, also Fig. 2.

In alignment with the passages G, G', H and H', there are cylinders L, L', M and M' located in section 58 of the housing. The pistons 81, operable within these cylinders, are mounted on rods 82 whose forward ends pass through bushings in the wall 56, and thus into the respective passages H, H', G and G', in which they are secured to respective piston valves 83. The opposite ends of these rods 82 pass through similar bushings in the rear wall of housing section 58 and thus into the chambers K and K', where they are attached by the screws 84 to the plate valve 85 in such a manner as to form a sliding hinge joint which does not force the pistons 81 to move simultaneously.

A system of passages 86, which communicate with the outlet 87, Figs. 1, 2 and 11, interconnects the forward ends of the four cylinders L, L', M and M'. Another similar system of passages 88, which communicates with the outlet 89, Figs. 1 and 13, interconnects the rear ends of these cylinders.

The operation of the above valves can be seen from a comparison of Figs. 12 and 14. In Fig. 12 the pistons 81 are at the rear of their travel. The ports N and O communicate through the chamber K and are sealed off from the channels H and G by the piston valves 83. Through the chambers K, fluid pumped by the gears 5, 6, and 6' flows freely between the ports N and O when the pumping capacity of these gears is not being utilized. In Fig. 14 the pistons 81 are at the forward end of their travel, and the ports N and O communicate with the passages G and H, respectively. Ports N and O are sealed by valve plate 85 from direct communication with each other through the chamber K. With the valves in this position, the gears 5, 6, and 6' supplement the pumping capacity of the gears 3, 4, and 4' by pumping fluid through the G, G', H, and H' passages which communicate with the respective passages E, E', F, and F'.

All the voids in the transmission are filled with a fluid, preferably a light grade lubricating oil, which serves as lubricant, hydraulic media, and control fluid. There are several external control connections for fluid flow in addition to those already mentioned. These connections are shown in Fig. 1. The outlet 90 communicates through the plate 10 with the space near the hub of the impeller disc 15. The outlet 91 passes through the outer walls of the casing 30 to the interior thereof. The oppositely disposed outlets 92 and 92', Fig. 6, connect with the forward ends of the chambers P and P', respectively. The oppositely disposed inlets 93, Fig. 1, and 93' (only 93' appears) connect with the rear ends of the chambers Q and Q' respectively.

In the particular transmission operation here considered, the power shaft 8 is regarded as being driven in a counterclockwise direction, viewed from the standpoint of Fig. 3. If the fluid-tight casing housing the first gear set which is secured to the power output shaft 21 through the plate 20, is restrained from moving, there is a tendency for the planet gears 2 and 2' of the first gear set to rotate in a clockwise direction, and for the fluid pressure in the ports A and A' to increase above the pressure in the ports B and B'.

As previously described, the A ports communicate with the C chamber and the B ports communicate with the D chamber. When the valve 7 is in the neutral position of Figs. 17 and 18, there is direct communication between the C and D chambers at the location where the transverse section of Fig. 17 is taken. Fluid is therefore free to flow between the A and B ports, circulating freely within the casing 18—19—20, so that the shaft 8 and associated sun gear 1 are free to rotate, without, in turn, rotating the said casing and the power output shaft 21.

When the valve 7 is in this neutral position, there is also direct intercommunication between the several ports E and F which handle the fluid being pumped by the variable gears and the timing gears associated with power output shaft 21, such direct intercommunication providing free circulation within the fluid system in the rear or back portion of the transmission. The shaft 21 is therefore relatively free to rotate in either direction when the valve 7 is in neutral position, no matter what the pumping capacity of its associated gears might be.

If, while the input shaft 8 is being driven as indicated, the valve 7 is slowly rotated through 60° in a counterclockwise direction (considered from the standpoint of Figs. 17 and 18) to the position shown in Figs. 17B and 18B, the free communication between valve chambers C and D, and therewith between the ports A and B, is closed. At the same time, the A and A' ports are brought into communication with the F and F' ports, through the C and C' chambers, Fig. 18B, while the B and B' ports are brought into communication with the E and E' ports, through the D chamber, Fig. 17B. A study of the ports in the valve 7 will show that this transition is made gradually. The gradual transition between neutral and a driving position provides a smooth clutching action between the input and output shafts; the energy represented by slip during clutching being converted to heat by throttling fluid through the closing ports.

When the valve 7 is in this position, any fluid which is to make its way from the A ports to the B ports to allow the gears 1, 2 and 2' of the first gear set to rotate with respect to their enclosing casing 18—19—20 will have to flow from the F ports to the E ports somewhere in the rear of the transmission. As seen in Fig. 7, any such flow will tend to rotate the gear 3, and therewith the shaft 21, in a counterclockwise direction. Such action will cause a positive forward drive, at reduced speed, from the power input shaft 8 to the power output shaft 21. The gears 1, 2 and 2' will transmit torque of the shaft 8 directly to the shaft 21 through the casing 18—19—20. The balance of energy, represented by the limited rotation of gears 1, 2 and 2' relative to their enclosing and power-transmitting casing and by the fact that the shaft 21 turns at a lower speed than the shaft 8, will be transmitted hydraulically back to the gears 3, 4 and 4' of the second gear set, or to the gears 5, 6 and 6' of the third gear set, where it will be impressed upon the shaft 21 in the form of increased torque.

With helical pumping gears, an unbalanced hydraulic pressure in the gear housing tends to offset the end thrust from the tooth pressure and to float the gears axially in the housing. However, since the end sections 53 and 53' of the housings for gears 4 and 4', respectively, are free to move with those gears, there will be a resultant end thrust, proportional to the end thrust from tooth pressure, which will tend to move these gears and associated structure axially in the housing. An examination of Fig. 2 will show that in transmitting a counterclockwise moment (considered from the right or rear end) to the gear 3, the gear 4 will develop an end thrust toward the right or rear end of the transmission. Control of the transmission ratio is accomplished by balancing this end thrust against hydraulic pressure built up in the chamber Q through the inlet connection 93.

The sequence of operation in progressively reducing speed is initiated by increasing the pressure in the chamber Q, by suitably introducing fluid through the inlet 93, until the gear 4 is completely in mesh with gear 3, which occurs when the pressure in Q reaches a set fraction of the difference in pressure between the A and B ports. Thereupon introduction of fluid into the chamber Q' through the inlet 93', will force the gear 4' into mesh with gear 3. When the pressure in Q' reaches the set fraction of the pressure difference between the A and B ports, introduction of control fluid to the rear of the cylinders L, L', M and M' through the inlet 89 will force the pistons 81 forward, opening communication between the channels G, G', H, H' and I, I', J, J', respectively, and bringing the timing gears 5, 6 and 6' into action as a gear motor. Simultaneous release of the pressures in chambers Q and Q' will let the gears 4 and 4' move back out of mesh so that their functional capacity is taken over by the timing gears in a relatively smooth action. Increased functional capacity may be then obtained by forcing gear 4, and then gear 4', back into mesh in the same manner as before.

Wherever mention is made in this text of causing axial motion by introduction of fluid into one chamber, it should be assumed that suitable relief is provided for fluid in the opposing chamber.

Equating the amount of fluid flowing through the variable capacity gears to that flowing through the fixed capacity gears gives a simple expression for the speed relationships in this transmission. The speed of rotation of the shaft 21 ($R_{21}$) multiplied by the active fluid capacity per revolution of the variable capacity gears and the timing gears ($C_{21}$), expressed in terms of the fixed capacity of the controlled gear set 1, 2 and 2', equals the difference between the speed of rotation of the shaft 8 ($R_8$) and the speed of rotation of the shaft 21 ($R_{21}$), multiplied by the capacity of the gear set 1, 2 and 2' ($C_8$), or:

$$R_{21}C_{21} = (R_8 - R_{21})C_8$$

or $$R_8 C_8 = R_{21}(C_{21} + C_8)$$

or the reduction ratio $$\frac{R_8}{R_{21}} = \frac{C_{21} + C_8}{C_8}$$

This expression shows how increasing the active capacity of the variable capacity gears causes an increase in the reduction ratio between shaft 8 and shaft 21.

In the transmission shown, the sets of gears 3, 4 and 4' and 5, 6 and 6', combined, have three times the pumping capacity of the first set of planetary gears 1, 2 and 2'. The lowest gear ratio, then, occurs when the difference in rotative speed between power input shaft 8 and output shaft 21 is three times that of power output shaft 21. Substituting in the speed ratio equation shows that there is a four to one reduction at this lowest gear ratio:

$$\frac{R_8}{R_{21}} = \frac{C_{21} + C_8}{C_8} = \frac{3C_8 + C_8}{C_8} = \frac{4}{1}$$

When the timing gears 5, 6 and 6' are not pumping and the variable capacity gears 4 and 4' are both out of mesh with the gear 3, no fluid can flow between the F ports and the E ports, and the gears 1, 2 and 2' of the first set cannot rotate within and relative to their enclosing casing 18—19—20. The transmission is then in direct drive, with all the power transmitted mechanically.

If, while the transmission is in this direct drive relationship and no fluid is flowing, the valve 7 is rotated a little more than 30° in a counterclockwise direction from the position illustrated in Figs. 17B and 18B, it reaches a position where communication to the F ports is completely sealed off. This is not one of the essential operating positions since the E and F ports are automatically sealed off by the pistons 47 and 47' and the piston valves 83 when in direct drive. However, since it provides a sealed direct drive in which only the low pressure from the B ports reaches the rear portions of the transmission and all leakage losses are eliminated, it could be used as an operating position to give a very efficient direct drive where such a drive was to be used a large portion of the time. To enable the controls to stop the valve 7 at this position, the diametrically opposite holes 94, shown dotted in Fig. 15, may be added.

If the counterclockwise rotation of the valve 7 is continued until it totals 60° from the position shown in Figs. 17B and 18B, it will be as illustrated in Figs. 17A and 18A. There the A ports communicate with the E ports through the C and the C' chambers, and the B ports communicate with the F ports through the D chamber. In Fig. 7 it can be seen that the high pressure from the A ports, when applied to the E ports, opposes the counterclockwise rotative drive which the planetary gear set 1, 2 and 2' transmits directly to the shaft 21 through the casing 18—19—20. As long as the variable capacity of the second gear set 3, 4 and 4' is not increased to equal or exceed the capacity of the first or planetary set, this opposing torque is not great enough to stop the counterclockwise rotation. The variable capacity gears 3, and 4 or 4' are therefore taking power from the shaft 21 to pump fluid through the E ports to the A ports of the first gear set.

The result of this flow can be seen in Fig. 3. The flow into the A ports causes the planet gears 2 and 2' to rotate as motor gears with respect to the sun gear 1, in counterclockwise direction. The net result, then is that the casing 18—19—20, and therefore the power output shaft 21, rotates in the same direction as the power input shaft 8 but at a higher speed. This speed ratio is controlled by the relative position, in the second gear set, of the gear 4 or 4' with respect to the gear 3.

To determine speed ratios in overdrive from the speed ratio equation, the capacity $C_{21}$ of the variable capacity gear set is given a negative value. The range of overdrive is theoretically infinite. In the transmission illustrated, only one of the gears 4 or 4' is used, and, since this one gear has three-fourths the capacity of the first gear set, the maximum overdrive ratio is four to one, as the equation will show:

$$\frac{R_8}{R_{21}} = \frac{C_{21}+C_8}{C_8} = \frac{-(3/4)C_8+C_8}{C_8} = \frac{1}{4} \text{ (Reduction)}$$

or $$\frac{R_{21}}{R_8} = \frac{4}{1} \text{ (Overdrive)}$$

Control in overdrive is accomplished the same as in speed reduction except that, since the end thrust on the gear 4 or 4' is forward, the control fluid is introduced through the inlet 92 or 92', Fig. 1, into the P or P' chamber, instead of into the Q or Q' chamber. It will be noted that control pressure which, in reduction, would force the two control gears farther into mesh, and in overdrive, would force them farther out of mesh, will in either case cause a reduction of gear ratio.

From the position illustrated in Figs. 17A and 18A, the valve 7 can be rotated back to the direct drive or speed reduction position or it can be returned to the neutral position, without passing through direct drive or reducing position, by merely rotating it another 60° in the counterclockwise direction.

If, while the valve 7 is in the neutral position shown in Figs. 17 and 18, the respective control gears 4 and 4' are forced completely into mesh with the gear 3, and the pistons 81 are forced forward to utilize the timing gears 5, 6 and 6' as pumping gears, and then the valve 7 is rotated 60° in a clockwise direction, the power output shaft 21 will be driven in a reverse direction relative to the power input shaft 8.

The valve 7, under these conditions, is in the position illustrated in Figs. 17A and 18A. Conditions are the same as in overdrive except that, in this case, the capacity of the second and third gear sets 3, 4, 4' and 5, 6, 6' which tends to reverse the direction of rotation of the shaft 21, is three times the capacity of the first gear set 1, 2 and 2' which tends to drive it forward. The net result is that the clockwise torque offsets the counterclockwise torque and exceeds it by two times and drives the shaft 21 in reverse at a two to one reduction. This is illustrated by the speed ratio equation as follows:

$$\frac{R_8}{R_{21}} = \frac{C_{21}+C_8}{C_8} = \frac{-3C_8+C_8}{C_8} = -2$$

This reverse ratio can be increased with infinite variation to a theoretically infinite overdrive by gradually decreasing the capacity of the controlling gear set 3, 4, 4' and timing gear set 5, 6 and 6', until it equals that of the controlled gears 1, 2 and 2'. It will be noted that the same control pressure which causes a reduction of gear ratio in forward drive, will cause an increase of gear ratio in reverse drive.

This transmission can be driven from the shaft 21 with equal flexibility, but with somewhat different characteristics. Shaft 8, then, of course, becomes the power output shaft.

The impeller 15 serves several purposes. It builds up a centrifugal pressure in the fluid reservoir formed by casing 30 and cover plate 10. Such pressure exceeds the pressure at the connection 90 (which may be vented to the atmosphere through a small auxiliary reservoir, not shown), by some function of the speed of rotation of the shaft 8. When this centrifugal pressure is tapped at the outlet connection 91, it can be used to supply pressure through the connection 42 for operating the valve-controlling gear motor 39 and 40, Fig. 6, thereby causing rotation of the control valve 7 from neutral position to either forward or reverse drive, and making clutching speed a function of the speed of the driving or power input shaft. Such pressure may also be utilized to maintain a positive pressure on the low pressure side of the pumping gears to prevent cavitation. Should the speed of rotation of the shaft 8 be a factor in the desired control, it may be utilized to regulate the control pressures which, through connections 93, 93' and 92, 92', position the gears 4 and 4'.

The impeller 15 can be weighted at its periphery to form a flywheel on the shaft 8. Further, it can be toothed to mesh with a starting gear for starting an internal combustion engine which might be coupled to the shaft 8.

The difference in pressure between the A ports and the B ports is a linear function of the torque applied to the shaft 8. These two pressures may be tapped from the C and D chambers at points 76 and 79. Through a suitable rectifying valve (not shown) to allow for a reversal of pressures when the torque is reversed, the low pressure side of these taps may be connected to the outlet 91. The high pressure side provides an actuating pressure, which may be used for operating the control valve 7 through the gear motor 39 and 40 and to provide control pressure. As a function of input torque the difference in these two pressures may be utilized to regulate the control pressure, if input torque is a factor in the desired ratio control.

Hydraulic ratio control of this transmission may be governed manually through a throttle valve or may be completely automatic to give any desired speed or torque characteristics. Automatic control may be governed by any external factor or, without external influence, may maintain constant speed or torque, or any desired relationship between speed and torque.

As has been stated, ratio control is accomplished by balancing the end thrust on the axially movable gear units of the variable capacity gear set 3, 4 and 4' against hydraulic pressure of the control fluid. The end thrust on these axially movable gear units varies with the pressure differential across the ports of the gear set as well as with the width of tooth face in mesh, or, to express it differently, the end thrust varies with the transmitted torque as well as with the transmission ratio. Thus, a constant control pressure will not necessarily maintain a constant transmission ratio.

In most cases, it is desirable to minimize or eliminate the direct effect of torque on the transmission ratio. For this purpose, the outlets 76 and 79 in the transmission housing provide an ideal source of fluid pressure differential for use in the ratio control. This pressure differential is essentially equal to the pressure differential across the ports of the variable capacity gears, which causes the end thrust on the axially movable gear unit. With this as a starting pressure, control may be accomplished through a ratio control valve which is adjustable to provide control fluid at any set fraction of this pressure. Such control fluid will oppose the end thrust of the movable gear units with a pressure which fluctuates to offset fluctuations in this end thrust caused by variations in torque, and the meshing relationship of the variable mesh gears, and thus the transmission ratio, will be dependent only upon the setting of the ratio control valve.

Briefly, automatic control of the transmission may be accomplished by using any desired influence to regulate such a valve as just described. The control mentioned earlier for automotive use would be an example of such an automatic control. The purpose of that control would be to maintain a relationship between the speed and torque of the input shaft 8 to correspond with the performance characteristics of the engine coupled to it so that the engine would always operate at the most advantageous speed and torque to develop any desired power. One way of accomplishing this is to utilize both the pressure difference between the outlets 90 and 91 in the transmission housing, which varies with the speed of rotation of the shaft 8, and the pressure difference between the outlets 76 and 79, which varies with the torque on the shaft 8, to regulate the ratio control valve.

In operation under this control, any variation which tends to cause the torque on the shaft 8 to deviate from the relationship between torque and speed designed into the ratio control valve operating means would change the setting of this valve and thus change the transmission ratio. For example, if the transmission were operating at a small reduction ratio with the gear 4 partially in mesh with the gear 3 and the load torque on the shaft 21 increased, the torque on the shaft 8 would begin to increase correspondingly. However this would cause an increase in pressure differential between the outlets 76 and 79 which would upset the balance in the ratio control valve operating means, change the setting of the ratio control valve, introduce additional fluid into the chamber Q through the opening 93, and force the gear 4 farther into mesh. This would increase the reduction ratio allowing the shaft 8 to maintain its original torque and speed while the additional torque on the shaft 21 would be obtained entirely through a sacrifice of speed at that shaft.

If, under similar conditions, additional fuel were supplied to the engine driving the shaft 8, the additional power it would develop would first be evidenced by a slight increase in torque on the shaft 8. This would increase the pressure differential across the outlets 76 and 79 throwing the ratio control valve operating means out of balance and increasing the reduction ratio of the transmission in the same manner as before. This would allow the shaft 8 to speed up increasing the pressure differential across the outlets 90 and 91. This variation in speed and torque would progress rapidly until a new balance of pressures were attained in the ratio control valve operating means at which time the engine would again be operating most satisfactorily to develop the increased power. The transmission ratio at which this condition would be reached would depend on the nature of the loading on the shaft 21. In other words, it would depend upon whether the increased power were absorbed through increased speed or increased torque. This example demonstrates the flexibility with which the engine could operate despite a relative inflexibility of loading.

In progressively increasing the reduction ratio, the gear 4' and the timing gears 5, 6 and 6' would be brought into action as described previously.

A decrease in torque would cause the reverse action to that described for increasing the torque. The gear 4 would be allowed to back farther out of mesh by a reduction of fluid pressure in the Q chamber and the reduction ratio would decrease. If balance were not attained in the ratio control valve operating means by the time the transmission was in direct drive, the ratio control means would supply fluid to the gear motor 39—40 through the openings 42 and 43 to cause this motor to rotate the valve 7 to overdrive position. Control fluid would then be introduced into the chamber P to check the tendency for the gear 4 to move into greater mesh with the gear 3, as outlined in the discussion of overdrive ratios.

With the addition of a single multiple port valve into the controls for this transmission, it is possible to change instantly from automatic, infinitely variable control to any one of five set speed ratios in a type of operation which uses infinite variation only in changing between these steps. The five positions which are attained by direct introduction of pumping pressure to give these speeds are: (1) all control gears out of action (direct drive); (2) control gear 4 in mesh (7:4 reduction); (3) gears 6 and 6' pumping (5:2 reduction); (4) gears 6 and 6' pumping and gear 4 in mesh (13:4 reduction); and gears 6 and 6' pumping and gears 4 and 4' in mesh (4:1 reduction).

The embodiment of the invention illustrated in Fig. 19 simplifies the construction and control of the transmission considerably; however, it also decreases the range of speed variation which can be obtained with a given size unit.

All parts in Fig. 19 are numbered the same as corresponding parts in Fig. 1 with a dash and the numeral one added. The portions of the transmission not shown in Fig. 19, that is, all parts forward of the plate 56—1, are the same as illustrated in Fig. 1 except that the F, F', G, and G' ports terminate at the rear of section 48 of the housing and do not enter section 54.

The timing gears 5—1, 6—1, and 6'—1 are not arranged here for use as pumping gears, and all of the ports, pistons, chambers and valves illustrated in Figs. 11, 12, 13 and 14 which control the operation of the gears 5, 6 and 6' are eliminated. The gears 5—1, 6—1, and 6'—1 are narrower around their periphery, and have central hubs at their rear faces, thereby providing passage for free flow of fluid adjacent the gear teeth.

With this construction hydraulic control is accomplished in much the same manner as described for the first construction, except that no timing gear control is necessary.

The embodiment illustrated in Fig. 20 constitutes a further simplification of the transmission. The plate 56 and section 58 of the housing and the splined shafts 55 are all eliminated by attaching the timing gears directly to the variable capacity gears. This construction is particularly well suited to manual control. Such a control is illustrated.

In Fig. 20, parts which are identical with or modifications of parts of the first embodiment are designated by the same number, with a dash and the numeral 2 added. Additional parts are designated by numbers starting with 100.

The gear 5—2 of the timing set is formed similarly to the gear 5—1 in the construction just described, so as to allow free flow of fluid past its teeth. The gears 6—2 and 6'—2 are attached to the rear of the gears 4—2 and 4'—2 by the screws 100 and dowel pins 101, which also secure the spacer discs 53—2 and 53'—2 in place.

The units made up of the gear 4—2, the spacer disc 53—2, the timing gear 6—2 and their primed counterparts are adapted to rotate on the respective hollow shafts 102 and 102'. The latter are fixed against rotation by the keys 103 and 103', which lock them to the pistons 47—2 and 47'—2, respectively. Locked nuts 104 and 104' secure the shafts to the pistons. Flanged heads 105 and 105' of shafts 102 and 102' hold the rotating planet gear units against the rear of the pistons 47—2 and 47'—2 with the proper running clearance.

The bores of hollow shafts 102 and 102' are decreased in diameter and threaded for a short distance from the flanged ends, to receive threaded shafts 106 and 106'. Circular flanges 107 and 107' on the shafts 106 and 106' are secured in the rear cover plate 60—2 between sets of washers 108 and 108' by means of cover plates 109 and 109', which are held in place by screws 110 and 110'. The flanges 107, 107' serve not only to prevent axial motion of the shafts 106, 106', but also as seal rings to prevent fluid leakage along the shafts. At the external ends of the shafts 106 and 106' knurled knobs 111 and 111' are attached.

In manual operation of speed control, the gears 4—2 and 4'—2 are set in any desired condition of mesh by turning the knobs 111 and 111'. Since the hydraulic control ports leading into the chambers P, P', Q and Q' are eliminated for manual control, it is necessary to provide another fluid connection between the P—2 and Q—2 chambers. This is done through the hollow shafts 102 and 102', and passages 112 through shafts 106 and 106'.

This transmission has the same range of speed variation for a given gear size as that illustrated in Fig. 19. The fact that the timing gears move completely out of mesh may, however, be considered a disadvantage in some instances, since this limits the type of teeth which the gears 4—2 and 4'—2 may have.

It is noted that any of the foregoing forms of the invention may be arranged for either manual or hydraulic control of the clutch or control valve 7, of the variable capacity gears, and of the auxiliary valve for the timing gears where such is provided. The alterations necessary to adapt the transmission from one type of control to the other are not considered to involve more than ordinary mechanical skill, and are not described here. However, hydraulic control of the embodiment illustrated in Fig. 20 must take into account the fact that there is communication between the Q—2 and Q'—2 chambers. Thus it is necessary either to allow the two gears 4—2 and 4'—2 both to move into mesh at once when control fluid is introduced into the Q—2 chambers, or to alter the control so as to introduce high pressure fluid into the P'—2 chamber while the control fluid in the Q—2 and Q'—2 chambers is forcing the gear 4—2 into mesh. In the latter instance the gear 4'—2 is brought into mesh by reducing the fluid pressure in the chamber P'—2.

Whereas the invention has been here illustrated and described with respect to several preferred specific forms thereof, it should be understood that various changes may be made therein and various other forms may be constructed by those skilled in the art, on the basis of the teachings hereof, without departing from the generic scope of the invention as defined by the following claims.

Having fully described this invention, what is claimed is:

1. An infinitely variable power transmission, comprising a stationary housing; two independent power shafts rotatably mounted in said housing; fixed displacement fluid motive means coupling said power shafts together for the transmission of rotative motion from one to the other at varying relative speeds; gear-type, variable displacement, fluid motive means coupling one of said power shafts to said housing for action either as a fluid motor or a fluid pump as the case may be; a second fixed displacement fluid motive means coupling the said one power shaft to said housing; means interconnecting said second fixed displacement fluid motive means with said variable displacement fluid motive means as a timer for the latter; a fluid circulatory system operatively interconnecting the first fixed displacement fluid motive means, the said variable displacement fluid motive means, and the said second fixed displacement fluid motive means; principal valve means controlling flow of fluid through said circulatory system; auxiliary valve means disposed in said circulatory system between said variable displacement fluid motive means and said second fixed displacement fluid motive means, for bringing said second fixed displacement fluid motive means into operation in the system as a fluid motor or fluid pump, as the case may be; and means for varying the displacement of said variable displacement fluid motive means during operation of said transmission.

2. An infinitely variable power transmission, comprising a stationary housing; two independent power shafts rotatably mounted in said housing; fixed displacement fluid motive means coupling said power shafts together for the transmission of rotative motion from one to the other at varying relative speeds; a set of variable-mesh gears coupling one of said power shafts to said housing as a variable displacement fluid motive means, for action either as a fluid motor or a fluid pump, as the case may be; another set of gears of constant mesh also coupling the said one power shaft to said housing; means interconnecting said constant-mesh gear set with said variable-mesh gear set as a timing means for the variable-mesh gears; a fluid circulatory system operatively interconnecting said fixed displacement fluid motive means, said variable-mesh gears, and said constant-mesh gears; principal valve means controlling flow of fluid through said circulatory system; auxiliary valve means disposed in said circulatory system between said variable-mesh gears and said constant-mesh gears, for bringing the constant-mesh gears into the system as a fluid motive means; means for varying the meshing relationship of said variable-mesh gears; and means for shrouding those portions of said variable-mesh gears which are not intermeshed, against pressure fluid from said circulatory system.

3. An infinitely variable power transmission in accordance with claim 2, wherein the set of variable-mesh gears comprises a gear mounted on the said one power shaft, and one or more gears movable axially into greater or lesser meshing engagement with the said mounted gear; wherein there is provided fluid-sealing means, including a piston extending from each of said movable gears, said movable gears being axially fixed but rotatable with respect to the respective pistons; wherein there are formed, within said housing, cylinders disposed substantially parallel to said one power shaft, said movable gears and piston extensions thereof being fitted into the respective cylinders for longitudinal movement; wherein said constant-mesh gears comprise a primary timing gear mounted on said one power shaft, and one or more secondary timing gears maintained in constant mesh with said primary timing gear, and said secondary timing gears being in axial alignment with the respective movable gears of the said variable set, and being mounted in common therewith on respective longitudinal shafts arranged to transmit power between said secondary timing gears and said movable gears; wherein all of the said gears are helically toothed, the teeth of the said variable-mesh gears being formed to provide lines of seal obstructing flow of fluid axially between the meshing teeth; wherein there is further provided a system of helical splines by means of which all said gears are splined to their respective shafts, said helical splines having the same lead as the helical teeth of the respective gears; and wherein said means for varying the meshing engagement comprise fluid supply connections leading to opposite end portions of said cylinders.

4. An infinitely variable power transmission in accordance with claim 2, wherein the set of variable-mesh gears comprises a gear mounted on the said one power shaft, and one or more gears movable axially into greater or lesser meshing engagement with the said mounted gear; wherein there is provided fluid-sealing means, including a piston extending from each of said movable gears, said movable gears being axially fixed but rotatable with respect to the respective pistons; wherein there are formed, within said housing, cylinders disposed substantially parallel to said one power shaft, said movable gears and piston extensions thereof being fitted into the respective cylinders for longitudinal movement; wherein said constant-mesh gears comprise a primary timing gear mounted on said one power shaft, and one or more secondary timing gears in alignment with the respective movable gears of said variable-mesh set, a collar located between each secondary timing gear and the respective movable gear, said collar, secondary timing gear, and movable gear being fixed relatively to one another, said collar constituting a part of said sealing means; and wherein the means for varying the said meshing engagement comprises manually adjustable members connected to the respective movable gear combinations and accessible exteriorly of the transmission for moving such movable gear combinations backwardly or forwardly in the said cylinders.

5. An infinitely variable power transmission in accordance with claim 2, wherein the set of variable mesh gears comprises a gear mounted on the said one power shaft, and one or more gears movable axially into greater or lesser meshing engagement with the said mounted gear; wherein there is provided fluid-sealing means, including a piston extending from each of said movable gears, said movable gears being axially fixed but rotatable with respect to the respective pistons; wherein there are formed, within said housing, cylinders disposed substantially parallel to said one power shaft, said movable gears and piston extensions thereof being fitted into the respective cylinders for longitudinal movement; wherein the fluid-circulatory system is formed within said housing and includes ports opening into the said mounted gear along the width of its toothed face, the said piston members being provided with wing extensions for variably closing said ports in accordance with the extent of non-meshing engagement of the said movable gears with said mounted gear; and wherein the means for varying the said meshing engagement comprises fluid-supply connections leading into opposite end portions of said cylinders.

6. An infinitely variable power transmission in accordance with claim 2, wherein the set of variable-mesh gears comprises a gear mounted on the said one power shaft, and one or more gears movable axially into greater or lesser meshing engagement with the said mounted gear; wherein there is provided fluid-sealing means, including a piston extending from each of said movable gears, said movable gears being axially fixed but rotatable with respect to the respective pistons; wherein there are formed, within said housing, cylinders disposed substantially parallel to said one power shaft, said movable gears and piston extensions thereof being fitted into the respective cylinders for longitudinal movement; wherein the fluid-circulatory system is formed within said housing and includes ports opening into the said mounted gear along the width of its toothed face, the said piston members being provided with wing extensions for variably closing said ports in accordance with the extent of non-meshing engagement of the said movable gears with said mounted gear; wherein the principal valve means comprises a ported rotary valve member and a housing cooperatively ported, the respective ports being so arranged as to provide, at one setting of the valve, for localized fluid circulations within the constant mesh gear set and the variable mesh gear set, but no circulation between the two sets; and wherein the means for varying the said meshing-engagement comprises fluid-supply connections leading into opposite end portions of said cylinders.

7. An infinitely variable power transmission in accordance with claim 2, wherein the set of variable-mesh gears comprises a gear mounted on the said one power shaft, and one or more gears movable axially into greater or lesser meshing engagement with the said mounted gear; wherein there is provided fluid-sealing means, including a piston extending from each of said movable gears, said movable gears being axially fixed but rotatable with respect to the respective pistons; wherein there are formed within said housing, cylinders disposed substantially parallel to said one power shaft, said movable gears and piston extensions thereof being fitted into the respective cylinders for longitudinal movement; wherein the fluid-circulatory system is formed within said housing and includes ports opening into the said mounted gear along the width of its toothed face, the said piston members being provided with wing extensions for variably closing said ports in accordance with the extent of non-meshing engagement of the said movable gears with said mounted gear; wherein the principal valve means comprises a ported rotary valve member, and a housing cooperatively ported, the respective ports being so arranged as to provide, at one setting of the valve, for localized fluid circulations within the planetary gear set and the variable mesh gear set, but no circulation between the two sets, and so as to provide, at other settings of the valve, for fluid circulation through the entire system in respectively different directions; and wherein the means for varying the said meshing engagement comprises fluid-supply connections leading into opposite end portions of said cylinders.

8. An infinitely variable power transmission in accordance with claim 2, wherein the gears of the variable-mesh gear set are helical, and have teeth formed to provide lines of seal obstructing flow of fluid axially between the meshing teeth.

9. An infinitely variable power transmission in accordance with claim 2, wherein the gears of the variable-mesh gear set are helically toothed with teeth having substantially no tip or back running clearance, said teeth having rounded tips and filled roots so that the spaces between teeth closely fit the outline generated in transit by the meshing teeth in passing through their meshing cycle and substantially prevent fluid flow between the intermeshing teeth axially of the gears.

10. An infinitely variable power transmission in accordance with claim 2, wherein the flow-control valve is rotary, hydraulic inflow port and flow passages lead from the exterior of the transmission to the exterior of said rotary valve, and a series of openings are provided circumferentially of said rotary valve for registry with said flow passages, whereby hydraulic fluid may be introduced to stop rotation of said valve at desired positions.

11. An infinitely variable power transmission in accordance with claim 2, wherein there is additionally provided a fluid reservoir associated with said power shafts; wherein a centrifugal fluid impeller is fixed to one of said power shafts within said reservoir for producing pressures within said reservoir which vary as a function of rotative speed of said one shaft; and wherein means is provided for tapping the varying fluid pressures built up within said reservoir for use in the control of said power transmission.

12. A transmission system comprising fixed displacement fluid motive means and variable displacement fluid motive means; means confining a hydraulic fluid agent in circulative association with both said motive means; the said fixed displacement motive means having intergeared components coupling input and output shafts of said transmission and disposed for differential operation, whereby the amount of fluid being circulated varies with the difference between input and output speeds of the transmission; and rotary valve means controlling the circulation of said confined fluid, the said valve means comprising concentric rotary members, means mounting one of said members for continuous rotation relative to the other, and sets of ports in the respective members, individual ports of which are adapted to register sequentially and repetitively at various selective positions of rotation of said one member relative to the other.

13. A transmission system according to claim 12 wherein is provided braking means for said valve.

14. Variable displacement fluid motive means, comprising a housing defining a fluid-tight gear chamber; two or more helically toothed gears arranged in intermeshing relationship within said chamber for relative axial movement into greater or lesser meshing engagement, said gears being helically toothed with teeth having substantially no tip or back running clearance, said teeth having rounded tips and filled roots, so that the spaces between the teeth closely fit the outline generated in transit by the meshing teeth in passing through their meshing cycle and substantially prevent fluid-flow between the intermeshing teeth, axially of the gears; means for effecting said relative axial gear movement; means for introducing pressure fluid into said gear chamber; and means for shrouding those portions of said gears which are not intermeshed, against said pressure fluid.

15. Variable displacement fluid motive means as recited in claim 14, wherein the tooth profiles of said gears consist of involute curves on the working faces, curves making an appropriate gradual transition between the involute curves and the addendum circle at the tooth tip, and other curves extending between the bases of adjacent teeth, such curves being formed to fit the envelope of the tip of the meshing tooth passing through its meshing cycle.

16. Variable displacement fluid motive means as recited in claim 14, wherein the tooth profiles of said gears consist of cycloidal curves on the working faces, appropriate curves making a gradual transition between the cycloidal face and the addendum circle at the tooth tips, and other curves extending between the bases of adjacent teeth, such curves being formed to fit the envelope of the tip of the meshing tooth passing through its meshing cycle, and wherein the said teeth have substantially no tip or back running clearance.

17. Variable displacement fluid motive means, a housing defining fluid-tight gear chambers; two or more helical gears arranged within certain of said chambers for relative axial movement into greater or lesser meshing engagement respectively with one another, the teeth of said gears having such profile as to provide a line of seal against axial flow through tooth spaces along the meshing helix; a corresponding set of gears in constant mesh arranged within others of said chambers to serve as timing gears for said variable displacement gears; one or more helically splined shafts of the same lead as said helical gears, through which the axially movable gears of the variable displacement set are connected to the respective axially fixed timing gears; means for effecting said relative axial gear movement; means for introducing pressure fluid into said gear chambers; and means for shrouding those portions of said gears which are not intermeshed, against said pressure fluid.

18. In a transmission, a variable displacement fluid motive means, comprising a housing defining fluid-tight gear chambers; two or more gears arranged within certain of said chambers for relative axial movement into greater or lesser meshing engagement respectively with one another; a corresponding set of gears in constant mesh arranged within others of said chambers to serve as timing gears for said variable displacement gears and also as a fixed displacement fluid motive means; one or more splined shafts through which the axially movable gears of the variable displacement set are connected to the respective axially fixed timing gears; a fluid circulatory system in flow communication with both the timing gears and the variable-mesh gears; valve means in said fluid circulatory system between said timing gears and said variable mesh gears, so arranged as to seal the fluid connections between the two said gear sets and allow local circulation of the fluid in the timing gear set or to stop said local circulation and provide connections whereby the fixed fluid motive displacement of said timing gear set can supplement the variable fluid motive displacement of said variable-mesh gears; means for effecting said relative axial gear movement; and means for shrouding those portions of said gears which are not intermeshed, against said pressure fluid.

19. Variable displacement fluid motive means, comprising a housing defining fluid-tight gear chambers, a set of helically toothed variable-meshed gears arranged within certain of said chambers for relative axial movement into greater or lesser meshing engagement with one another, respectively, the teeth of said gears having substantially no tip or back running clearance, and having rounded tips and filled roots, so that the spaces between the teeth closely fit the outline generated in transit by the meshing teeth in passing through their meshing cycle and substantially prevent fluid-flow between the intermeshing teeth, axially of the gears; fluid-sealing means associated with the axially movable gears of said variable-mesh gears, for sealing those portions thereof which are not intermeshed at any given time, said gear chambers including cylinders in which said movable gears and said fluid-sealing means move longitudinally; and fluid-flow connections to opposite end portions of said cylinders for hydraulically positioning said movable gears and said sealing means against end thrust.

20. Variable capacity fluid motive means, comprising a housing defining fluid-tight gear chambers; a set of variable-mesh gears arranged within certain of said chambers for axial movement into greater or lesser engagement with one another respectively; fluid sealing means at both ends of the axially movable gears of said variable-mesh gears; the said sealing means on one set of ends of said movable gears constituting piston extensions of the respective gears, said movable gears being rotatable with respect to said piston members but axially fixed to move longitudinally with said piston members, and said piston members being recessed arcuately to contact the tooth tips of the non-meshing portion of the respective axially fixed gears; wings on said piston members providing an extension of the arcuate surface of said recesses and adapted to seal port openings into the non-active portion of said variable-mesh gears; means for introducing pressure fluid into said chambers; and means for effecting said axial movement of the gears.

DOUGLAS A. ELKINS.

References Cited in the file of this patent

UNITED STATES PATENTS

| Number | Name | Date |
|---|---|---|
| 711,662 | Herdman | Oct. 21, 1902 |
| 1,080,282 | Kellogg | Dec. 2, 1913 |
| 1,243,640 | Story | Oct. 16, 1917 |
| 1,726,454 | Rayburn et al. | Aug. 27, 1929 |
| 1,870,824 | Shepard | Aug. 9, 1932 |
| 1,914,090 | Hamilla et al. | June 13, 1933 |
| 1,998,922 | Chamberlain et al. | Apr. 23, 1935 |
| 2,029,742 | Sieverts | Feb. 4, 1936 |
| 2,149,326 | Wilkins | Mar. 7, 1939 |
| 2,151,415 | Bennetch | Mar. 21, 1939 |
| 2,159,744 | Maglott | May 23, 1939 |
| 2,190,122 | Mohler | Feb. 13, 1940 |
| 2,198,891 | Thoma | Apr. 30, 1940 |
| 2,341,624 | Kieser | Feb. 15, 1944 |
| 2,371,922 | Saito | Mar. 20, 1945 |
| 2,374,588 | Doran | Apr. 24, 1945 |

FOREIGN PATENTS

| Number | Country | Date |
|---|---|---|
| 253,454 | Great Britain | June 17, 1926 |
| 377,031 | France | June 28, 1907 |
| 592,428 | France | Apr. 30, 1925 |
| 596,140 | France | Aug. 1, 1925 |
| 713,285 | France | Aug. 11, 1931 |
| 741,103 | France | Dec. 2, 1932 |
| 133,893 | Switzerland | Nov. 16, 1929 |
| 345,523 | Germany | Dec. 12, 1921 |